Patented May 15, 1945

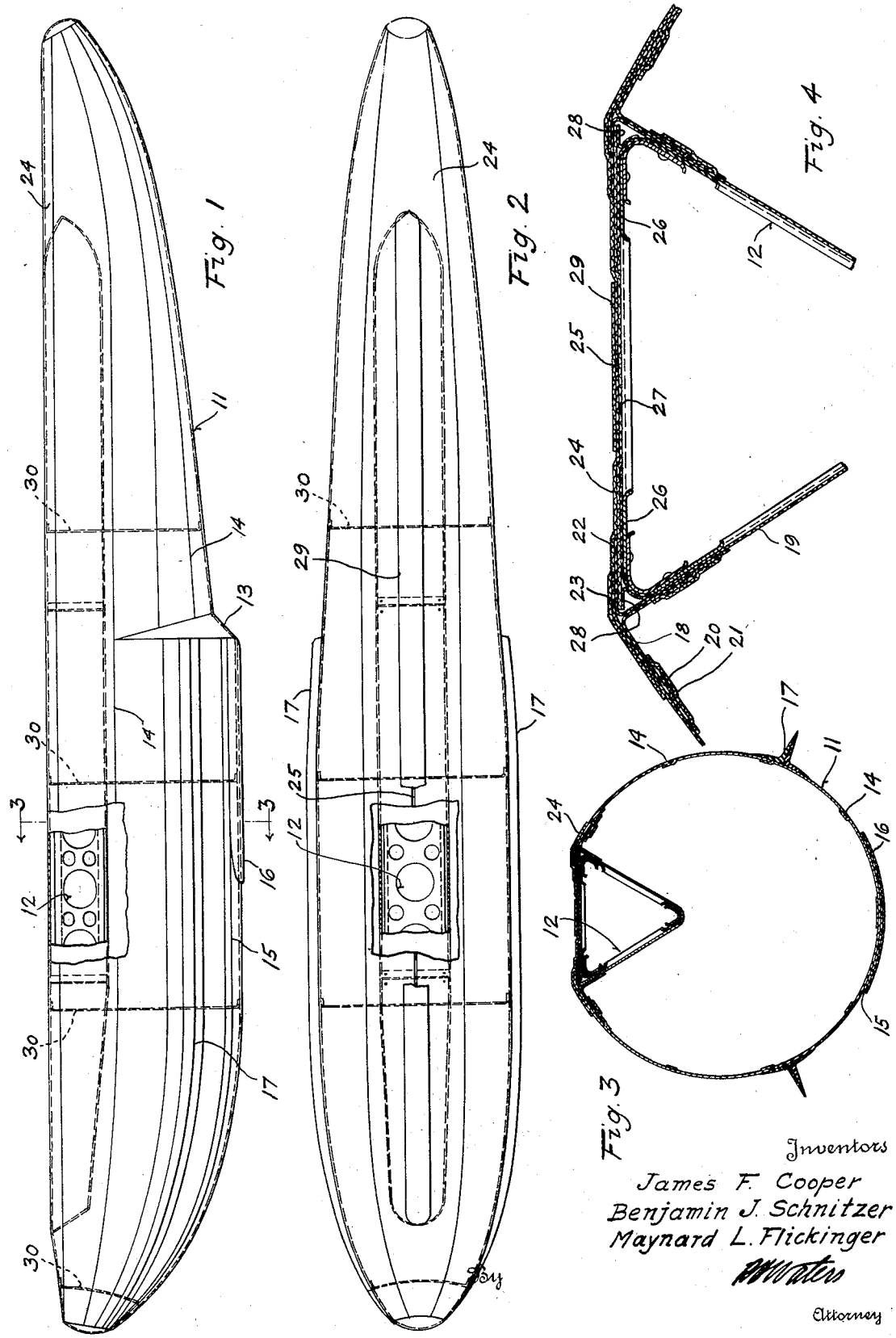

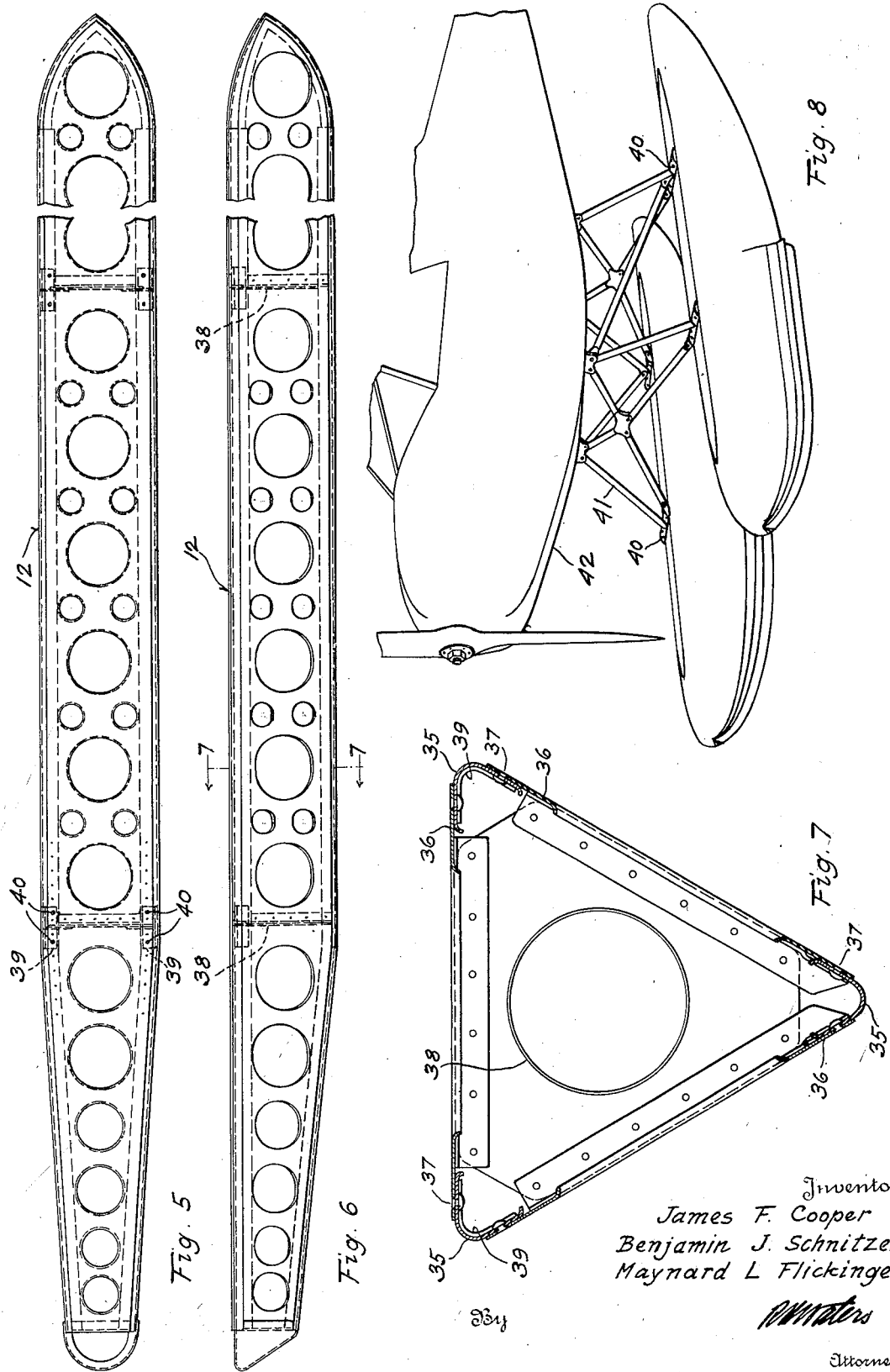

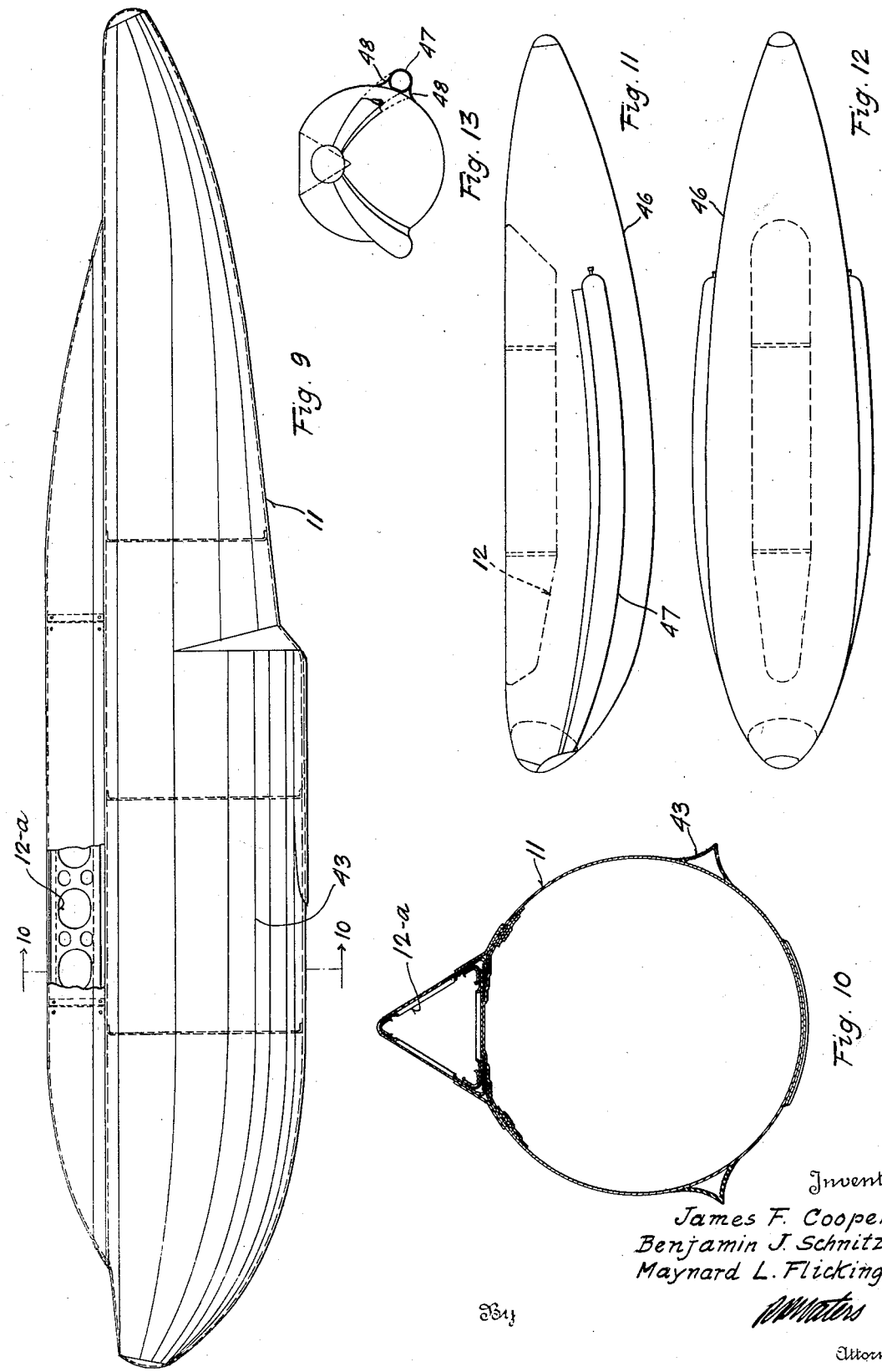

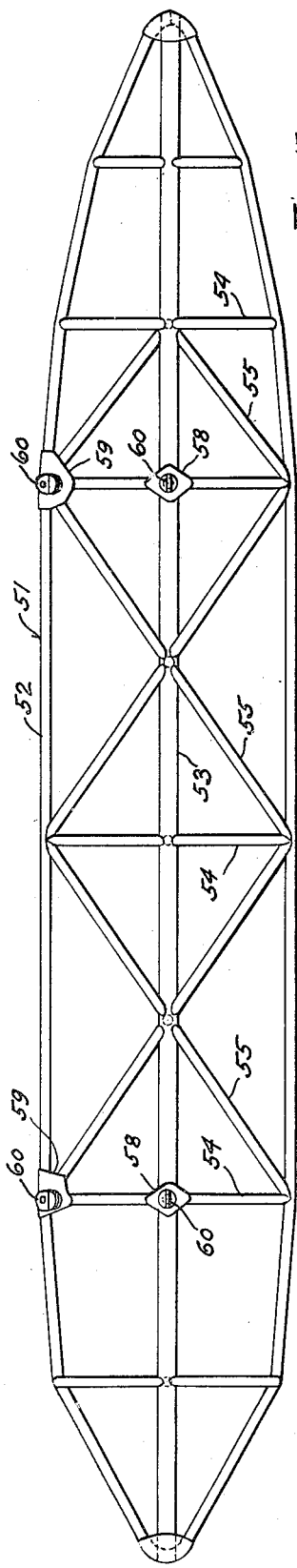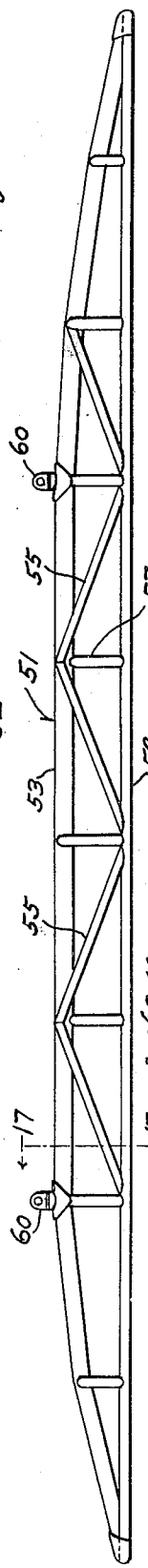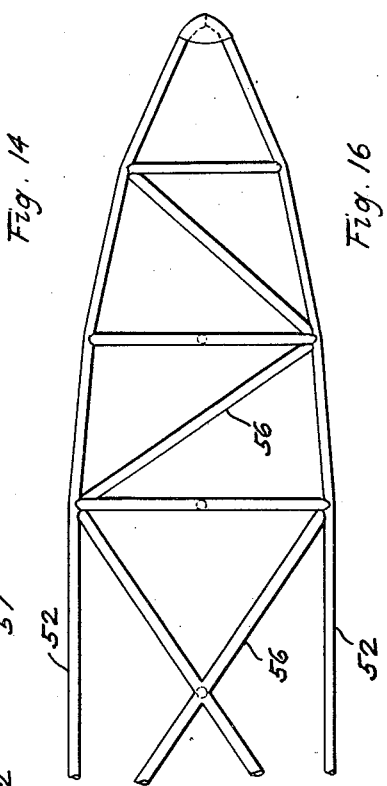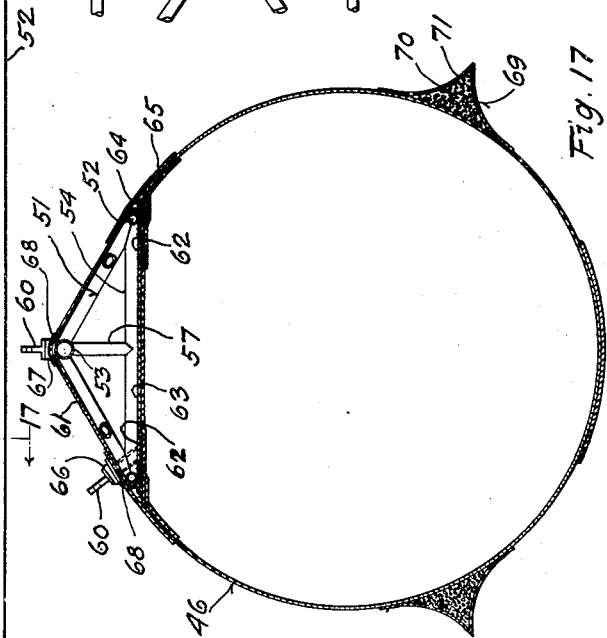

2,375,973

UNITED STATES PATENT OFFICE 2,375,973

PNEUMATIC FLOAT FOR AIRCRAFT

James F. Cooper, Akron, Benjamin J. Schnitzer, Stow, and Maynard L. Flickinger, Akron, Ohio, assignors to Wingfoot Corporation, Akron, Ohio, a corporation of Delaware Application August 3, 1940, Serial No. 350,374

12 Claims. (Cl. 114—66.5)

This invention relates to improvements in floats and, more particularly, to inflatable floats especially used for the landing gear of seaplanes and the like, inclusive of wing-tip floats for flying boats, but also applicable for other purposes.

One object of this invention is to improve the longitudinal stiffness of such floats, that is, to make them more resistant against distortion when striking or riding on the water.

An inflatable float, the top of which is provided with a flat, tubular frame-work for the purpose of attaching the float to the strut work of the fuselage of a seaplane, has been previously known. The present invention is an improvement thereover.

This invention overcomes certain objectionable features of the prior art in an ideal way by employing a light, hollow longitudinal girder capable of resisting in vertical, as well as in horizontal, direction, without any appreciable deflection, all forces to which the float might be subjected in service. This girder, located in the center of the float and preferably made of triangular cross-section, or being of any other suitable cross-section, is preferably embedded within the top cover which is fully sealed against penetration of water. In some cases the girder is put advantageously on top outside of the float and then sealed up by an additional water-tight cover. Such a construction is very compact and strong and distributes the forces which act on the float more uniformly to the supporting strut work. Due to the rigidity of this girder the flexible float body will fully maintain its longitudinal shape, except in so far as it is influenced by the change of its cross-sectional shape. Therefore, the flow of the water along the float will be much smoother than is the case with former constructions and, accordingly, will create less resistance in the water.

In order to obtain a better understanding of this invention reference is now made to the accompanying drawings of which:

Fig. 1 is a side view of one form of landing float constructed according to this invention.

Fig. 2 is a top view of the same;

Fig. 3 is a cross-section taken on the line 3—3 of Fig. 1;

Fig. 4 is an enlargement of a portion of Fig. 3 showing the details of attachment of the girder to the inflatable float body;

Fig. 5 is a top view of the float girder per se as applied in Fig. 1;

Fig. 6 is a side view of the same;

Fig. 7 is a cross-section in enlarged scale on the line 7—7 of Fig. 6;

Fig. 8 is a perspective view of a pair of the improved landing floats assembled on a seaplane fuselage;

Fig. 9 is a view similar to Fig. 1 but showing a modified form of the invention;

Fig. 10 is a cross-section taken on the line 10—10 of Fig. 9;

Fig. 11 is a side view of a wing-tip float without a step at the bottom;

Fig. 12 is a top view of the same;

Fig. 13 is a front view thereof;

Fig. 14 is a side view of another modification of a float girder construction;

Fig. 15 is a top view of the same;

Fig. 16 is a fragmentary bottom view of the construction shown in Figs. 14 and 15;

Fig. 17 is a cross-section taken on line 17—17 of Fig. 14 and shown with an inflatable float attached to it.

The float shown in Fig. 1 consists in principle of an inflatable air container 11 and of a rigid triangular girder 12 of hollow cross-section. This girder is inserted within the circumference of the air container and extends over the greatest portion of the length thereof. The air container 11 of elongated streamline shape is provided at its bottom with a step 13 which permits an easy take-off from the water. The flexible material employed for the construction of the air container or float is preferably rubberized fabric. The inflatable container is built up of longitudinal gores, the edges of which overlap each other and are cemented together at 14. The number of fabric plies of which the circumferential wall may be built up depends on the size of the floats. At the bottom of the float is provided a reinforcement strip 15 to which is applied a rubber chafing strip 16 for protection. At both sides of the front portion of the float ahead of the step are provided spray guards 17 made of angular rubber strips cemented together in T-shaped cross-section and secured to the outer wall to prevent the water from creeping to the top of the float. Angle-shaped strips 18 are cemented to the inside of the outer wall adjacent the upper limits of the side walls of the float and to the cover 19, forming a pocket for receiving the girder 12. The edges of the angle strips 18 are covered by strips 20 and 21 somewhat stiffening and reinforcing the outer cover at those points. The edges 22 of the cover 19 are bent over toward each other and strips 23 connect portions of these edges near the bends with the portion near the bend of the upper flange of the angle strips 18. The strips 23 are in the same plane as the outer wall of the float and are butting with it. The top gore 24 of the float, which is provided with a slit 25, closes the top of the triangular girder pocket. The girder 12 which can be inserted in the pocket through this slit has cemented to its top two or more side strips 26 which also cover the round corners of the girder, and a strip 27 extending over the full width of the girder is cemented to the side strips. The edges of the strip 27 protruding over the straight portion of the girder are cemented by angle strips 28 to the side strips 26. By cementing the strip 27 to the inner face of the outer cover the girder is held in position against shifting in the float. The slit 25 is then sealed by a cover strip 29. Bulkheads 30 divide the float into a number of compartments to minimize danger of water-logging in case of damage.

The girder 12 of the triangular cross-section may be appropriately built up of suitable sheet material such as aluminum alloy, steel or the like, and is shown composed of angle bars 35 and perforated side plates 36 which are connected together by rivets 37. The outside heads of these rivets are advantageously countersunk where in contact with the fabric and the ends of the girder are shaped suitably to prevent eventual damage to the float when it is subjected to some deformation. Bulkheads 38 and reinforcements 39 are provided in the girder at the points where the floats are attached by bolts 40 to an airplane substructure 41, which in turn supports the fuselage 42.

A modification of the float construction, described above, is shown in Fig. 9, with the difference that the supporting and stiffening girder 12ª is not inserted within the collapsible float 11, but is placed on top of it. The detail of the construction is in principle the same as that described above and therefore does not require repetition here. The splash guards 43 in this case represent another modified feature, they being shown of hollow construction to be made of rubber or rubber with fabric inserts. The longitudinal shape of the girder 12ª is made to suit conditions.

In Figs. 11, 12 and 13 the invention is shown as embodied in a wing-tip float which is relatively smaller in size than a landing float, but which in principle is substantially the same construction as that shown in Fig. 1, except that on the float 46 the step is omitted and the spray guards 47 are made inflatable. Fillets 48 smooth out the corners between the spray guard and the float wall to reduce water and air resistance.

Another variation in the construction of a float-supporting girder is shown in the Figs. 14, 15, 16 and 17. This girder 51, also of triangular cross-section, is built up of light-weight tube material, preferably steel. It is composed of longitudinals 52 and 53 which converge at both ends of the girder into pointed ends. Transverse members 54 spaced along the longitudinals hold the latter in position, and diagonal braces 55 and 56 on the upper side and lower side, respectively, give the girder its rigidity. Vertical members 57 stiffen the bottom diagonal and cross-members against bending. All members are welded together. Gusset plates 58 and 59 are provided to accommodate the eye bolts 60, or other means for attaching the float to the wing or substructure.

Fig. 17 indicates how the last-described girder 51 is attached to the top of the float 46. The attachment is practically the same as shown in Fig. 10. The outer cover 61 of the girder has its edges 62 tucked underneath the longitudinals 52 and cemented to same, and a flat strip 63 is stretched over the bottom of the girder and cemented to the bottom portions of the cover 61. Angle strips 64 attached to the cover 61 support the extending edges of the strip 63 to which they are cemented. The strip 63 is cemented to the top of the float 46 and the outer strips 65 connect the cover 61 with the float hull 46. Special washers 66 and 67, under which sealing gaskets 68 are placed, are employed as seat for the eye bolts. The spray guards 69 are a modification of these described previously. They consist of a core 70 made of light-weight rubber foam or material having equivalent properties which is enclosed by a cover 71 made of rubber or rubberized fabric to which it is cemented. The guard unit is cemented to the float.

From the foregoing description it will be evident that the invention provides improved floats and pontoons for aircraft, wherein relatively light weight is obtained with high unit strength. The bodies of the floats and pontoons are freely flexible, air-tight, and water-proof, and are adequately reinforced by the novel box-type girders which also provide means of connection with appropriate aircraft substructures.

Having given a detailed description of this invention, it is to be understood that the invention shall not be limited to the examples illustrated and described, but that many other combinations and variations therefrom might be made without departing from the spirit and scope of this invention as defined by the attached claims.

What we claim is:

1. A pneumatic float for seaplanes comprising an inflatable body built of freely flexible, non-metallic material, and a longitudinally extending rigid girder of generally triangular cross-section connected to said body and adapted to resist, without appreciable deflection, the forces to which the float is normally subjected under service conditions, yet leaving the bottom and sidewalls of the inflatable body freely flexible in all directions.

2. A pneumatic float for seaplanes comprising an inflatable body built of freely flexible air-tight and waterproof material, and a longitudinally extending rigid metallic girder located within the circumference of and connected to said body and adapted to resist, without appreciable deflection, the forces to which the float is normally subjected under service conditions, yet leaving the bottom and sidewalls of the inflatable body freely flexible in all directions.

3. A pneumatic float for seaplanes comprising an inflatable body built of freely flexible material, a pocket extending longitudinally inside of said body through the major part of its length, and a rigid girder placed and fastened in said pocket and adapted to resist, without appreciable deflection, the forces to which said float might be subjected under service conditions, yet leaving the bottom and sidewalls of the inflatable body freely flexible in all directions.

4. A pneumatic float for seaplanes comprising an inflatable body built of rubberized fabric material, a rigid girder extending longitudinally within said body, a covering of flexible material enclosing and being at least at one side cemented to said girder, and means for securely attaching said girder to said inflatable body, said girder being adapted to resist, without appreciable deflection, the forces to which said float might be subjected under service conditions, yet leaving the bottom and sidewalls of the inflatable body freely flexible in all directions.

5. A pneumatic float for seaplanes comprising an inflatable body built of rubberized fabric material, a box girder of triangular cross-section extending longitudinally over the major part of the length of and within said body, and means for attaching said girder to said inflatable body, said girder being adapted to resist, without appreciable deflection, the forces to which the float might be subjected under service conditions, yet leaving the bottom and sidewalls of the inflatable body freely flexible in all directions.

6. A pneumatic float for seaplanes comprising an inflatable body built of rubberized fabric material, a box girder assembled of plural members of metallic sheet material extending longitudinally through the major part of the length of and within said inflatable body, and means for attaching said girder to the wall top portion of said body, said girder being adapted to resist, without appreciable deflection, the forces to which the float might be subjected under service conditions, yet leaving the bottom and sidewalls of the inflatable body freely flexible in all directions.

7. A pneumatic float for seaplanes comprising an inflatable body built of freely flexible, resilient material, a box girder assembled of tubular material extending over the major part of the length of said inflatable body, and means for attaching said girder to the top portion of said body, said girder being adapted to resist, without appreciable deflection, the forces to which the float might be subjected under service conditions, yet leaving the bottom and sidewalls of the inflatable body freely flexible in all directions.

8. A pneumatic float for seaplanes comprising an inflatable body built of pliable material, a box girder placed outside of and extending over the major part of the length of said body, and means for attaching said girder to said body, said girder being adapted to resist without appreciable deflection, the forces to which the float might be subjected under service conditions, yet leaving the bottom and sidewalls of the inflatable body freely flexible in all directions.

9. A pneumatic float for seaplanes comprising an elongated inflatable body of flexible, airtight and waterproof material and an elongated rigid box girder including means for connecting the float to a seaplane, said girder being secured to said body at the top and within the circumference thereof, the bottom and side walls of said body being freely flexible in all directions under service conditions.

10. A pneumatic float as claimed in claim 9 wherein the girder is of generally triangular cross section.

11. A pneumatic float as claimed in claim 9 wherein the girder is located within a fabric pocket.

12. A pneumatic float as claimed in claim 9 wherein the girder is of generally triangular cross-section and is located within a fabric pocket.

JAMES F. COOPER.
BENJAMIN J. SCHNITZER.
MAYNARD L. FLICKINGER.